Patented Dec. 5, 1944

2,364,172

UNITED STATES PATENT OFFICE 2,364,172

COATING COMPOSITIONS

Harry G. Stauffer, Drexel Hill, Pa., assignor to E. I. du Pont de Nemours & Company, Wilmington, Del., a corporation of Delaware No Drawing. Application October 11, 1941, Serial No. 414,603

8 Claims. (Cl. 260—42)

This invention relates to vinyl resin coating compositions and more particularly to such compositions containing in part a vinyl halide resin forming material.

The production of resinous bodies by the partial or complete polymerization of a vinyl compound or a mixture of two or more vinyl compounds is well known. The vinyl resins possess many properties which make them desirable for use as protective coatings and also useful in molded and formed articles. In drying or baking such coatings applied to certain metals, for example bare tinplate or black iron, the polymeric vinyl compound tends to decompose at relatively low temperatures particularly if applied in thicknesses of coating ordinarily used for such resinous compositions. Even in thinner films decomposition takes place at the relatively low temperatures. In order to develop other desirable properties in these vinyl resin coatings, it is necessary to heat or bake the coatings at higher temperatures. The polymeric vinyl compounds such as contain a vinyl halide are thus not thermally stable. Many types of materials have been proposed as thermal stabilizers but these in most instances possess certain inherent objections to their broad general use. Among such materials proposed as thermal stabilizers may be mentioned alkali metals, alkaline earth metals, cadmium, lead, manganese, etc., soaps; blue lead; white lead, red lead, and lead compounds as the chromate, hydroxide, etc., cadmium, lead and calcium stearate; organo-metallic aryl derivatives of lead and tin as tetraphenyl lead, propyl triphenyl lead, tetraphenyl tin, etc.; pitch containing quinoline or similar nitrogenous base; compounds such as resorcinol disalicylate, resorcinol dibenzoate, ortho, meta and para cresyl benzoate, etc.; quinine; complex heterocyclic nitrogenous bases; urea, substituted ureas, urea salts and others. As is apparent many of these materials are for various reasons not satisfactory for general use.

The principal object of the present invention is the provision of vinyl resin compositions by means of which strongly adherent, substantially colorless and highly resistant coatings or finishes may be produced.

Another object is the provision of a novel process for producing such adherent and resistant coatings.

A further object is the provision of vinyl resin compositions and means for producing coatings therefrom which are free of objectionable ingredients and which may find broad general use.

Still another object is the provision of vinyl resin compositions which will produce strongly adherent, transparent, substantially colorless and highly resistant coatings and finishes and are economical to use.

Other objects will be apparent from the description of the invention which follows.

These objects are accomplished by providing vinyl resin compositions containing at least in part a vinyl halide resin to which has been added a relatively minor quantity of a condensation product obtained from urea, amino triazines or substituted products thereof, aldehydes and monohydric alcohols.

The invention will be more fully understood by the following examples which are given by way of illustration and not limitation except insofar as defined in the appended claims. The parts are by weight.

Example I

| | Parts |
|---|---|
| Vinyl chloride-vinyl acetate copolymer | 20 |
| Methyl ethyl ketone | 80 |

To this solution of the vinyl resin was added 5%, based on the vinyl resin content, of a urea-formaldehyde-butyl alcohol resin in solution diluted with an equal volume of a mutual solvent as butyl acetate and the solution thoroughly mixed. The resin solution was then sprayed by conventional means onto a suitably cleaned metal surface and baked at 400–435° F. for approximately 15 minutes. If desired the resin solution may be applied to the metal surface or article by dipping or any other convenient means well known in the art. After baking there is produced on the metal surface a coating wthich is transparent, substantially colorless, tenaciously adherent and highly resistant to the action of chemicals and other deteriorating influences.

If the vinyl resin copolymer solution suitably diluted as previously described to which no urea-formaldehyde-butyl alcohol resin has been added is similarly applied to a cleaned metal surface and baked, it darkens and becomes dark brown or practically black at approximately 325° F. The film is substantially deteriorated so that it has no practical value as a protective coating. If the resin is baked at a lower temperature so as not to cause discoloration and deterioration, the coating is poorly adhered to the metal surface and is not satisfactorily resistant to the deteriorating influences with which it is likely to come into contact.

The vinyl copolymer resin used above was an approximately 87/13% copolymer of vinyl chloride-vinyl acetate.

The urea-formaldehyde monohydric alcohol resin used was a solution in butyl alcohol containing approximately 55% solids and was such as described in U. S. Patent No. 2,191,957. Alcohols other than butyl alcohol, such as propyl, isopropyl, isobutyl, amyl, octyl, etc. may be used in the preparation of the urea-formaldehyde monohydric alcohol resin solution and used in the present invention.

Any solvents commonly used in the preparation of vinyl resin solutions are satisfactory but it is preferred that they be mutual solvents for the vinyl resin and the thermal stabilizing agent used.

Example II

| | Parts |
|---|---|
| Chlorinated polyvinyl chloride | 20 |
| Acetone-toluol (50/50) | 80 |

To this solution was added 5% (based on the vinyl resin solids in the solution) of the urea-formaldehyde-monohydric alcohol resin solution used in Example I. When applied to a suitably cleaned metal surface as previously described and baked at approximately 425° F. for approximately 15 minutes, a transparent, substantially colorless, strongly adherent, highly resistant film was obtained. The same vinyl resin containing no urea-formaldehyde-monohydric alcohol resin when baked above approximately 350° F. discolors badly and if baked at temperatures at which discoloration does no take place, produces poorly adherent films which in addition are not satisfactorily resistant to deteriorating influences.

Example III

To the vinyl chloride-vinyl acetate copolymer resin solution of Example I was added 6% (based on the vinyl resin solids of the solution) of a melamine - formaldehyde - monohydric alcohol resin solution plasticized with a fatty oil modified alkyd resin. The resin solution was thoroughly agitated and when applied to a cleaned metal surface as previously described and baked at 425° F. for approximately 15 minutes, produced a transparent, substantially colorless, tenaciously adherent and highly resistant coating. Without the melamine-formaldehyde-monohydric alcohol resin, the vinyl resin discolored badly and produced a brittle film when baked at temperatures far below those necessary to produce satisfactorily adherent films.

Other urea or aminotriazine-aldehyde-monohydric alcohol reaction products as the mono or dialkyl ethers of dimethylol urea may be used with equal success as is obtained with the materials given in the examples. For example 6% of the diisobutyl or dimethyl ether of dimethylol urea (based on the vinyl resin solids of the solution) produces the satisfactory films as described under Example I. Among other thermal stabilizing agents within the purview of the present invention may be mentioned the dibutyl, diisopropyl, diethyl ether of dimethylol urea; butyl and isobutyl ether of monomethylol urea; dimethylol urea monomethyl ether, dimethylol urea monobutyl or monoisobutyl ether, etc.; various alkyl ethers of methylol melamine or substituted triazines and similar materials of the general class noted.

The urea - formaldehyde - monohydric alcohol resin solutions and the corresponding amino triazine resins may be used as such or they may be plasticized with fatty oil modified alkyd resin as illustrated in Example III.

While dimethylol urea, monomethylol urea and similar reaction products of urea and formaldehyde impart thermal stabilizing properties to the vinyl resin compositions, their use is not preferred due mainly to difficulties encountered in introducing these materials into the vinyl resin solutions. Under certain conditions they may be however, used satisfactorily.

It is to be understood that urea alone, while it may have some stabilizing effect on certain vinyl resins, is not the equivalent of the urea-formaldehyde resins disclosed above. The same is true of formaldehyde.

The present invention is generally applicable to interpolymers and copolymers of vinyl halides and vinyl esters of fatty acids of various percentage compositions. Also to vinyl halide polymers alone as well as to after treated vinyl halide polymers as halogenated vinyl halide polymers and the like. Such vinyl resin polymers, copolymers and interpolymers find wide commercial application as protective and decorative coatings. The vinyl resin polymer compositions of the present invention may be used to produce clear coatings or pigmented coatings. The vinyl resin polymers may be further plasticized where desired or necessary with other resinous materials or suitable softeners. Such modifications are readily understood by and will be apparent to those skilled in the art of using vinyl resin polymer compositions.

The amount of thermal stabilizer used, based on the vinyl polymer resin solids has been found to range between approximately 2 and 15% with a preferred range of between 4 and 8%. Amounts of less than 2% are not satisfactorily effective and amounts greater than 15%, while they may be used are no more effective as thermal stabilizers than the lesser amounts.

The invention presents as the principal advantage the production of strongly adherent, substantially clear and colorless or satisfactorily pigmented highly resistant coating or finishes. A further advantage is the production of vinyl polymer resin compositions which are free from objectionable ingredients and which permit of broad general use through the use of readily available materials. Other advantages will be readily apparent to those skilled in the art of using vinyl polymer resin solutions.

It is apparent that many widely different embodiments of this invention may be made without departing from the spirit and scope thereof, and therefore, it is not intended to be limited except as indicated in the appended claims.

I claim:

1. A coating composition comprising a vinyl resin at least part of which is a vinyl halide resin and a minor amount of a soluble condensation product of material selected from the group consisting of urea, and amino triazines, with formaldehyde and a monohydric alcohol, said minor amount being of the order of 2 to 15 per cent based on the weight of the vinyl resin.

2. The composition of claim 1 in which the vinyl resin is a copolymer of vinyl chloride and vinyl acetate.

3. The composition of claim 1 in which the resin present in minor amount is urea-formaldehyde-butyl alcohol resin.

4. The composition of claim 1 in which the vinyl resin is a chlorinated polyvinyl chloride resin.

5. The composition of claim 1 in which the percentages of the resin in minor amount is between 4 and 8% based on the vinyl resin.

6. A metallic surface having a baked film of the composition of claim 1.

7. A coating composition having approximately the following composition:

| | Parts |
|---|---|
| Vinyl chloride-vinyl acetate polymer | 20 |
| Methyl ethyl ketone | 80 |
| Butyl alcohol soluble urea-formaldehyde-butyl alcohol resin intermediate | 1 |

8. The process of finishing a metallic surface with a strongly adherent colorless film which comprises applying thereto a solution of a vinyl chloride resin and from 2 to 15% thereof of a urea-formaldehyde-butyl alcohol resin, allowing the solvent to evaporate and thereafter baking the surface at 400–435° F. for about 15 minutes.

HARRY G. STAUFFER.